(12) United States Patent
Kinnunen et al.

(10) Patent No.: US 9,334,610 B2
(45) Date of Patent: May 10, 2016

(54) FIBROUS WEB OF PAPER OR BOARD AND METHOD OF MAKING THE SAME

(71) Applicant: STORA ENSO OYJ, Helsinki (FI)

(72) Inventors: Karita Kinnunen, Vtt (FI); Tuomo Hjelt, Vtt (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 14/396,554

(22) PCT Filed: Apr. 24, 2013

(86) PCT No.: PCT/FI2013/050460
§ 371 (c)(1),
(2) Date: Oct. 23, 2014

(87) PCT Pub. No.: WO2013/160553
PCT Pub. Date: Oct. 31, 2013

(65) Prior Publication Data
US 2015/0114581 A1    Apr. 30, 2015

(30) Foreign Application Priority Data

Apr. 26, 2012   (FI) ...................................... 20125462

(51) Int. Cl.
| D21H 27/30 | (2006.01) |
| D21H 11/18 | (2006.01) |
| D21H 21/24 | (2006.01) |
| D21H 21/56 | (2006.01) |
| D21F 11/00 | (2006.01) |
| B32B 5/26 | (2006.01) |
| B32B 7/02 | (2006.01) |
| B32B 29/00 | (2006.01) |
| D21H 17/09 | (2006.01) |

(52) U.S. Cl.
CPC .................. *D21H 27/30* (2013.01); *B32B 5/26* (2013.01); *B32B 7/02* (2013.01); *B32B 29/005* (2013.01); *D21F 11/002* (2013.01); *D21H 11/18* (2013.01); *D21H 17/09* (2013.01); *D21H 21/24* (2013.01); *D21H 21/56* (2013.01); *B32B 2250/26* (2013.01)

(58) Field of Classification Search
USPC ......................................... 162/125, 123, 158
See application file for complete search history.

(56) References Cited

U.S. PATENT DOCUMENTS

| 3,489,827 A | 1/1970 | Mueller et al. |
| 3,716,449 A | 2/1973 | Gatward et al. |
| 3,839,142 A | 10/1974 | Clarke et al. |
| 3,871,952 A | 3/1975 | Robertson |
| 3,938,782 A | 2/1976 | Robertson |
| 4,184,914 A | 1/1980 | Jenkins |
| 4,597,831 A | 7/1986 | Anderson |
| 4,952,278 A | 8/1990 | Gregory et al. |
| 6,103,060 A | 8/2000 | Munerelle et al. |
| 6,562,193 B1 | 5/2003 | Elonen et al. |
| 6,602,994 B1 | 8/2003 | Cash et al. |
| 6,749,718 B2 * | 6/2004 | Takai et al. ................... 162/115 |
| 7,166,190 B2 | 1/2007 | Graef et al. |
| 2005/0250861 A1 | 11/2005 | Andersson |
| 2011/0088860 A1 | 4/2011 | Heijnesson-Hulten et al. |

FOREIGN PATENT DOCUMENTS

| CN | 1285437 A | 2/2001 |
| EP | 1783201 A1 | 5/2007 |
| FI | 980072 A | 7/1999 |
| GB | 1 395 757 | 5/1975 |
| GB | 1397178 A | 6/1975 |
| GB | 1 551 710 | 8/1979 |
| JP | 2005-223806 A | 8/2005 |
| WO | WO01/42564 A1 | 6/2001 |
| WO | WO02/090653 A2 | 11/2002 |
| WO | WO 2004/113613 A1 | 12/2004 |
| WO | WO 2009/038735 A1 | 3/2009 |
| WO | WO 2010/015726 A1 | 2/2010 |
| WO | WO 2012/007363 A1 | 1/2012 |

OTHER PUBLICATIONS

Application and File History for U.S. Appl. No. 14/396,634, filed Oct. 23, 2014, Inventors Isto Heiskanen et al.
PCT International Search Report and PCT Written Opinion of the International Searching Authority for PCT/FI2013/050471, mailed Aug. 22, 2013, 13 Pgs.
Office Action and Search Report issued in Finnish Application No. 20125463, dated Mar. 22, 2013, 4 Pgs.
Radvan, B., Gatward, A. P. J., "The formation of wet-laid webs by a foaming process", Tappi, vol. 55 (1972) p. 748.
Wiggins Teape Research and Development Ltd., "New process uses foam in papermaking instead of avoiding it", Paper Trade Journal , "Now in Our Hundreth Year", Nov. 29, 1971, pp. 44-45.
Smith, M. K., Punton, V. W., Rixson, A. G., "The structure and properties of paper formed by a foaming process", Tappi, Jan. 1974, vol. 57, No. 1, pp. 107-111.
PCT International Search Report and PCT Written Opinion of the International Searching Authority for PCT/FI2013/050460, mailed Aug. 22, 2013, 10 pgs.
Office Action and Search Report issued in Finnish Application No. 20125462, dated Feb. 26, 2013, 1 pg.
Chinese Office Action for Chinese Patent Application No. 201380021542.0 dated Sep. 22, 2015.
English translation of Chinese Office Action for Chinese Patent Application No. 201380021542.0 dated Sep. 22, 2015.

* cited by examiner

*Primary Examiner* — Mark Halpern
(74) *Attorney, Agent, or Firm* — Patterson Thuente Pedersen, P.A.

(57) ABSTRACT

The invention relates to a fibrous web product such as paper, and a method for the preparation of such fibrous web. According to the method microfibrillated cellulose (MFC) together with a pulp of a greater fiber length, such as chemithermomechanical pulp (CTMP), are mixed with a foam of water and a sur-factant, the foam is supplied to a forming fabric of a paper or board machine, dewatered by suction of air through the forming fabric, and dried to the final web product. The method brings a high bulk in combination with a high Scott bond value, to provide improved wet and dry tensile strength for the paper and board products.

17 Claims, 1 Drawing Sheet

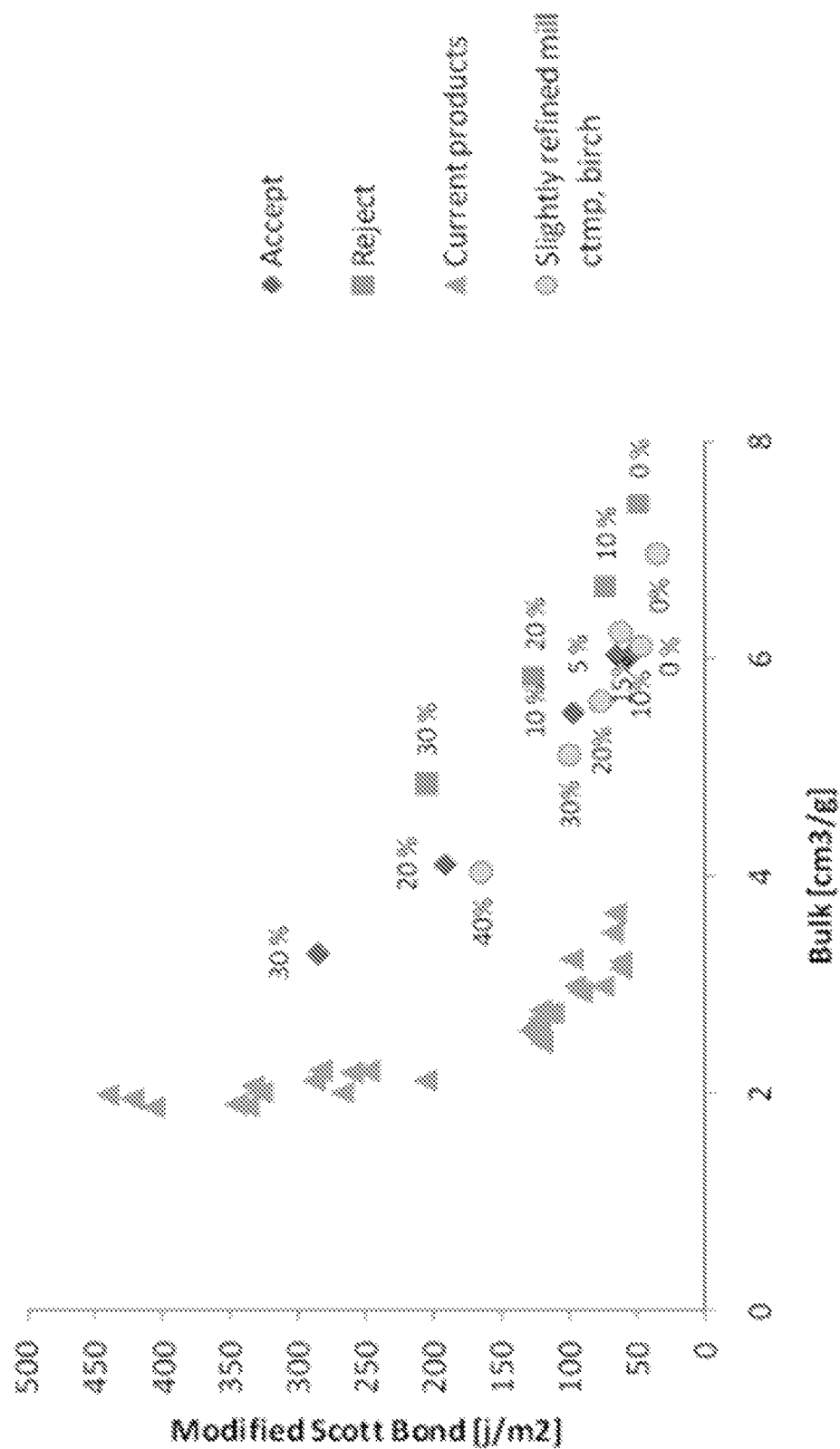

FIBROUS WEB OF PAPER OR BOARD AND METHOD OF MAKING THE SAME

RELATED APPLICATIONS

This application is a National Phase entry of PCT Application No. PCT/FI2013/050460, filed Apr. 24, 2013, which claims priority to Finland Application No. 20125462, filed Apr. 26, 2012, the disclosures of which are hereby incorporated by reference herein in their entirety.

The present invention relates to a method for the preparation of a fibrous web of paper or board, a fibrous web obtained by a method, and a multilayer board comprising such web as at least one of the layers. As a particular aspect, foaming technique is used in the invention for producing the fibrous web.

BACKGROUND OF THE INVENTION

In the paper industry foam technique, where foam is used as a carrier phase of materials, has been used in both web formation and web coating processes. The technique is described e.g. in the publications Radvan, B., Gatward, A. P. J., The formation of wet-laid webs by a foaming process, Tappi, vol 55 (1972) p. 748; a report by Wiggins Teape Research and Development Ltd., New process uses foam in papermaking instead of avoiding it, Paper Trade Journal, Nov. 29, 1971; and Smith, M. K., Punton, V. W., Rixson, A. G., The structure and properties of paper formed by a foaming process, TAPPI, January 1974, Vol. 57, No 1, pp. 107-111.

In GB 1 395 757 there is described an apparatus for producing a foamed fiber dispersion for use in the manufacture of paper. A surface active agent is added to fibrous pulp with a fibre length in excess of about 3 mm, to provide a dispersion with an air content of at least 65%, to be discharged onto the forming fabric of a papermaking machine. The aim is to achieve uniform formation of the fibrous web on the fabric.

By the middle of the 1970s the foam forming process had been successfully demonstrated on a production machine. In the Wiggins Teape Radfoam process (Arjo Wiggins) fibres were delivered to the wire of a conventional Fourdrinier paper machine in suspension in aqueous foam. The development team obtained a non-layered 3D structure in papers made on a Fourdrinier machine at very high concentrations of fibres (3-5%) in water using foam.

When comparing foam and water forming methods one trend is clear. With foam forming the bulk is bigger, but the tensile index is smaller. With a bulkier structure the structure is more porous, which leads to smaller tensile index values. An interesting result from a comparison of water and foam laid samples was that tensile stiffness indexes in both cases were very close even though foam formed samples were much bulkier. The reason for that is currently unknown and requires further research.

Surfactants used in the foaming process have a negative influence on both the dry and wet tensile strength of a paper web.

The tensile strength loss may be explained by a decrease in the dry tensile strength of a paper sheet as surfactants are adsorbed on fibre surfaces hindering hydrogen bonding between the fibres. The initial wet strength is reduced by surfactants, especially for a dry content of 8-25%, due to a reduction in surface tension which results from the weakening of the main force holding the wet sheet together.

According to current understanding the main problems, which have prevented foam forming from becoming a standard web forming technology in paper, paperboard and cardboard production, are:
- too high porosity in some applications,
- reduced strength properties compared to normal low consistency wet forming,
- inferior Scott bond,
- inferior tensile strength, and
- inferior elastic modulus.

With foam forming a higher bulk (lower density) can be obtained as compared to normal wet forming. For typical printing and packaging paper and board grades the main drawbacks are the loss of elastic modulus ("softness") and internal strength (Scott bond or z-strength). However, the same characteristics are advantages in tissue making. Thus foam forming has been much more common in tissue paper products.

A more recent approach of improved papermaking, aiming at improving dewatering and retention of papermaking chemicals in a fibrous web formed on a forming fabric, is incorporation of microfibrillated cellulose (MFC) in the pulp suspension. U.S. Pat. No. 6,602,994 B1 teaches use of derivatized MFC with electrostatic or steric functionality for the goals, which even include better formation of the web. According to the reference the microfibrils have a diameter in the range of 5 to 100 nm.

However, the drawbacks experienced with MFC are densification and high drying shrinkage of the paper, as well as a tendency of MFC to absorb and retain a substantial amount of water, which increases the energy required for drying and reduces paper machine speed and productivity. For these reasons MFC has not won extensive use in paper industry so far.

SUMMARY OF THE INVENTION

The object of the present invention is to overcome or substantially reduce the above problems regarding printing and packaging papers and boards, by way of finding a method of making a foam formed fibrous web, lending a substantially increased strength to paper and board products while preserving the low density. The solution according to the invention is production of a web through the steps of (i) providing a foam of water and a surfactant, (ii) incorporating microfibrillated cellulose together with a pulp of a greater fibre length in the foam, (iii) supplying the foam onto a forming fabric, (iv) dewatering the foam on the forming fabric by suction to form a web, and (v) subjecting the web to final drying.

In some aspects of the present invention, a continuous fibrous web is formed on a running forming fabric of a paper or board machine, dewatered by suction through the web and the forming fabric, and finally dried in a drying section of the paper or board machine.

In some aspects of the present invention, the web is dewatered by suction of air through the web and the forming fabric at a pressure of at most 0.6 bar, followed by predrying by suction of air at a pressure of at most about 0.3 bar.

In some aspects of the present invention, mechanical pulp, such as chemithermomechanical pulp (CTMP), is incorporated in the foam.

In some aspects of the present invention, the fibrous components incorporated in the foam consist of about 5 to 40 wt-% of MFC and about 60 to 95 wt-% of pulp with longer fibres.

In some aspects of the present invention, the foam is brought to an air content of 60 to 70 vol-% before being supplied onto the forming fabric.

In some aspects of the present invention, the surfactant is sodium dodecyl sulphate (SDS).

In some aspects of the present invention, a fibrous web is obtained by the foregoing method, wherein the web comprises a mixture of microfibrillated cellulose (MFC) and a pulp of a greater fibre length, and that the web has a bulk of at least 2.5 cm$^3$/g. In some other aspects, the web has a bulk of 3 to 7 cm$^3$/g.

In some aspects of the present invention, the web has a Scott bond value of at least 50 J/m$^2$, preferably 120 to 200 J/m$^2$.

In some aspects of the present invention, the pulp of a greater fibre length is mechanical pulp, preferably CTMP.

In some aspects of the present invention, the web comprises about 5 to 40 wt-% of MFC and about 60 to 95 wt-% of pulp of a greater fibre length.

In some aspects of the present invention, at least one of the layers is a fibrous web. In some aspects, the board comprises as a middle layer a fibrous web, as well as outer layers having a bulk lower than in the middle layer.

DESCRIPTION OF THE DRAWING

FIG. 1 is a graph showing the results of dried handsheets tested by measuring the bulk and modified Scott bond for each sheet according to certain aspects of the present invention in comparison to current products made by conventional non-foaming papermaking techniques.

DETAILED DESCRIPTION OF THE INVENTION

The present invention is directed at a method of making a foam formed fibrous web, lending a substantially increased strength to paper and board products while preserving the low density, the production of the web comprising the steps of (i) providing a foam of water and a surfactant, (ii) incorporating microfibrillated cellulose together with a pulp of a greater fibre length in the foam, (iii) supplying the foam onto a forming fabric, (iv) dewatering the foam on the forming fabric by suction to form a web, and (v) subjecting the web to final drying.

In particular, it has surprisingly been found that a pulp of a high fiber length, mechanical or chemical, can be advantageously used in foam forming in combination with microfibrillated cellulose. Even though use of MFC in papermaking is known as such, to the applicant's knowledge incorporation of MFC into a foam has not been suggested in the prior art, and the benefits were not foreseeable to a skilled person.

The microfibrils of MFC typically have a fibre length of about 100 nm to 10 μm and a fibre diameter of about 3 to 50 nm. The term microfibrillated cellulose (MFC) as used to define the invention also covers nanofibrillated cellulose (NFC). The pulp combined with MFC by definition has a greater fibre length, preferably about 1 mm or more. A particularly suitable pulp for use in the invention is chemithermomechanical pulp (CTMP).

In addition to CTMP, other long fibre pulps useful in the invention are chemical pulps, chemimechanical pulp (CMP), thermomechanical pulp (TMP), GW, and other high yield pulps such as APMP and NSSC.

Without being bound to any theory it is believed that in the combination the long fibres of CTMP or the like provide the bulky structure and the MFC provides the bonding between the long fibres. The method according to the invention has been found to achieve a bulk of at least 2.5 cm$^3$/g, preferably 3 to 7 cm$^3$/g. The method also proved to work well with CTMP milling reject, showing the possibility to use less refined pulp for the product, e.g. folding boxboard middle layer.

In the foam forming neither individual long fibres nor MFC alone is able to form flocks, but however, MFC is able to build bridges between individual long fibres thus lend surprisingly good strength properties to the web.

As foam forming prevents flock formation between long fibres, very good grammage formation can be gained. This improves the evenness of the print quality as there is less calibre variation in the paper and board.

These stiff long fibres of CTMP are able to maintain the bulky structure in wet pressing and drying thus giving surprisingly good bulk for the sheet.

An interesting result in comparison of water and foam laid samples was that tensile stiffness index was very close in both cases even though the foam formed samples were much bulkier. The reason for that is currently unknown and it needs more research.

According to an embodiment of the invention a continuous fibrous web is formed in an industrial scale on a running forming fabric of a paper or board machine, dewatered by suction through the web and the forming fabric, and finally dried in a drying section of the paper or board machine.

Another embodiment of the invention comprises dewatering the web by suction of air through the web and the forming fabric at a pressure of at most 0.6 bar, followed by predrying by suction of air at a pressure of at most about 0.3 bar.

According to a further embodiment of the invention the fibrous components incorporated in the foam consist of about 5 to 40 wt-%, preferably 10 to 40 wt-% of MFC and about 60 to 95 wt-%, preferably 60 to 90 wt-% of pulp with longer fibres.

According to a still further embodiment of the invention the foam is brought to an air content of 60 to 70 vol-% before being supplied onto the forming fabric. The consistency of the pulp subjected to foaming may be 1 to 2% based on the amount of water. Suitable amount of surfactant in the foam may be in the range of 0.05 to 2.5 wt-%, but will be easily determinable by a skilled person.

The preferred surfactant for use in the invention is sodium dodecyl sulphate (SDS), but other typical surfactants may be used as well.

Foam forming by use of long cellulosic fibres and added microfibrillated cellulose in the foam is thus very suitable and promising method for producing all paper and board grades needing best possible formation combination with best possible bending stiffness.

Such products include for example all paperboard grades such as:

cartonboards, including folding boxboard, white line chipboard, solid bleached board, solid unbleached board, liquid packaging board etc., container boards, including linerboard, corrugated medium etc., special boards, including core board, wall paper base, book binding board, woodpulp board, etc.

The products also include for example paper grades such as newsprint, improved news print, rotonews, MFC, LWC, WFC, art and ULWC.

The high bulk high strength structure achieved according to the invention can also be used for example:

as middle ply in multiply structures (papers and boards), in lamination to other paper structures and/or plastic film layers, as fibrous base for extrusion coating with plastics, as heat insulation, noise insulation, liquid and moisture absorber, as formable layer in moulded structures such as trays, cups, containers.

The fibrous web according to the invention, which is obtainable by the method as described in the above, comprises a mixture of microfibrillated cellulose (MFC) and a pulp of a greater fibre length, and has a bulk of at least 2.5 cm$^3$/g, preferably a bulk of 3 to 7 cm$^3$/g.

The fibrous web according to the invention may have a Scott bond value of at least 50 J/m$^2$, preferably 120 to 200 J/m$^2$.

The pulp of a greater fibre length in the fibrous web according to the invention may be mechanical pulp, preferably CTMP. In general the fibrous web comprises about 5 to 40 wt-% of MFC and about 60 to 95 wt-% of pulp of a greater fibre length.

As the fibrous web according to the invention is used as a single layer in a multilayer paperboard or cardboard, it is preferably positioned as a middle layer, while the outer surface layers may be fibrous webs of a lower bulk than said middle layer. For instance denser print plies with a high elastic modulus, made by standard papermaking techniques, may constitute such outer layers. The multilayer products obtainable by use of the invention include folding boxboards, liquid packaging boards and cupboards for instance. However, it is possible to produce all the layers of a multilayer board by the foam forming technique according to the invention.

EXAMPLES

Foam laid handsheets of a size 38.5 cm×26.5 cm were made by the following procedure: foam was produced by mixing water and sodium dodecyl sulphate (SDS) as a surface active agent in ratio 0.15-0.2 g/l with a drilling machine (3500 rpm) as far as the air content of foam is 60-70%. The target air content of foam was determined by the foaming set-up; when the foam reaches the target air content the level of the foam surface does not rise anymore and the mixing starts to decrease the bubble size of the foam. When the foam was ready a fiber suspension comprising CTMP and NFC (Daicel KY-100G, 10.7%) was mixed with the prefabricated foam. Mixing was continued until the target air content was reached again. In stable condition the distances between fibrous particles in the foam remained constant and no flocculation happened. After that the foam was decanted into a handsheet mold and filtrated through a wire using an exhauster and a vacuum chamber. The wire was of the type conventionally used for water based forming. Then the wire and the handsheet formed thereon were removed from the mold and predried on a suction table by use of an exhauster. The suction table has a suction slit, width 5 mm that suck air through the sheet with 0.2 bar vacuum.

According to the above procedure handsheets were made from pulps with different shares of NFC mixed with CTMP accept (379 CSF), reject or slightly mill refined, namely 5, 10, 15, 20, 30 and 40%. Handsheets of mere 100% CTMP (0% NFC) were made for comparison.

The dried handsheets were tested by measuring the bulk and modified Scott bond for each sheet. The results are shown graphically in FIG. 1. The share of NFC is marked beside each measured result. The FIGURE also includes a number of current products made by conventional non-foam papermaking techniques for comparison.

The tests show that e.g. 20% of NFC mixed with CTMP accept pulp increased the Scott bond value from 55 to 190 J/m$^2$; the corresponding bulk values are 6 and 4 g/m$^3$. The increase in CTMP reject sheets was 50 to 127 J/m$^2$ in Scott bond and the corresponding bulk values 7.4 and 5.8 g/m$^3$. Target values of a middle layer of folding boxboard are a bulk of at least 2.5 g/m$^3$ and Scott bond >100. The results show that it is possible to produce a high bulk middle layer of folding boxboard having the internal strength properties needed from coarse fiber material mixed with NFC by foam forming. The possibility of forming the middle layer of folding boxboard from less refined CTMP pulp is also shown by the results. The economical influences of the invention are savings in refining energy of pulps and in drying energy of foam formed web. Also the benefit of foam forming, excellent formation regardless of fiber length, enables thinner surface layers and coating layers of folding boxboard.

The tests also showed that the distances between fibrous particles in flowing foam remain constant, i.e. fibers do not flocculate. When a web is made from this kind of foam, for example by suction through the forming fabric of a papermaking machine, the fibers preserve their non-flocculated state and form a web with excellent formation. The structural pressure foam applies to the structure when removed is much less compared to conventional removal of the water, thus resulting in a high bulk. Combining foam forming with web drying by suction air through the web (e.g. using a suction slot) it is possible to reach a web solid content of over 70% and retain the high bulk. Nanocellulose (NFC) added to the fiber material to be foamed increases internal strength properties of the web formed.

The invention claimed is:

1. A method for the preparation of a fibrous web of paper or board, the method comprising the steps of:
   providing a foam of water and a surfactant;
   incorporating microfibrillated cellulose (MFC) together with a pulp in the foam, wherein a fibre length of the of the pulp is greater than a fibre length of the MFC;
   supplying the foam onto a forming fabric;
   dewatering the foam on the forming fabric by suction to form a web; and
   subjecting the web to final drying.

2. The method of claim 1, wherein a continuous fibrous web is formed on a running forming fabric of a paper or board machine, dewatered by suction through the web and the forming fabric, and finally dried in a drying section of the paper or board machine.

3. The method of claim 1, wherein the web is dewatered by suction of air through the web and the forming fabric at a pressure of at most 0.6 bar, followed by predrying by suction of air at a pressure of at most about 0.3 bar.

4. The method of claim 1, wherein mechanical pulp is incorporated in the foam.

5. The method of claim 4, wherein the mechanical pulp is chemithermomechanical pulp (CTMP).

6. The method of claim 1, wherein the fibrous components incorporated in the foam consist of about 5 to 40 wt-% of MFC and about 60 to 95 wt-% of pulp with longer fibres.

7. The method of claim 1, wherein the foam is brought to an air content of 60 to 70 vol-% before being supplied onto the forming fabric.

8. The method of claim 1, wherein the surfactant is sodium dodecyl sulphate (SDS).

9. The method of claim 1, wherein the web comprises a mixture of microfibrillated cellulose (MFC) and a pulp, and that the web has a bulk of at least 2.5 cm$^3$/g.

10. The method of claim 9, wherein the web has a bulk of 3 to 7 cm³/g.

11. The method of claim 9, wherein the web has a Scott bond value of at least 50 J/m².

12. The method of claim 11, wherein the Scott bond value is between 120 J/m² to 200 J/m².

13. The method of claim 9, wherein the pulp is mechanical pulp.

14. The method of claim 13, wherein the pulp is CTMP.

15. The method of claim 9, wherein the web comprises about 5 to 40 wt-% of MFC and about 60 to 95 wt-% of pulp.

16. The method of claim 9, further comprising positioning the fibrous web as a middle layer in a multilayer board.

17. The method of claim 16, wherein the multilayer board comprises the middle layer and at least two outer layers, the fibrous web comprises the middle layer of the multilayer board and the two outer layers having a bulk lower than the middle layer.

* * * * *